United States Patent [19]

Okumura et al.

[11] Patent Number: 4,781,234

[45] Date of Patent: Nov. 1, 1988

[54] SECURING DEVICE FOR A BAGGAGE COVER SHEET WINDER

[75] Inventors: Hitoshi Okumura; Susumu Mizobuchi, both of Ohta, Japan

[73] Assignee: NHK Spring Co., Ltd., Yokohama, Japan

[21] Appl. No.: 39,108

[22] Filed: Apr. 16, 1987

Related U.S. Application Data

[62] Division of Ser. No. 551,608, Nov. 14, 1983, Pat. No. 4,668,001.

[30] Foreign Application Priority Data

Nov. 16, 1982 [JP] Japan .................................. 57-173227
Dec. 7, 1982 [JP] Japan .................................. 57-184251
Mar. 3, 1983 [JP] Japan .................................. 58-29933

[51] Int. Cl.$^4$ .............................................. E04F 10/02
[52] U.S. Cl. .................................. 160/23.1; 160/323.1; 296/37.16
[58] Field of Search ............... 160/323 R, 323 B, 23 R, 160/313, 290 R; 296/37.16; 248/239, 223.4

[56] References Cited

U.S. PATENT DOCUMENTS

| | | | |
|---|---|---|---|
| 225,021 | 3/1880 | Phelan | 160/323 |
| 689,339 | 12/1901 | Wilson | 160/326 |
| 1,736,527 | 11/1929 | Garcia | 160/23 R X |
| 1,942,308 | 1/1934 | Renzetti | 160/323 |
| 4,139,231 | 2/1979 | Lang et al. | 296/37.16 |
| 4,168,094 | 9/1979 | Yagi | 296/37.16 |
| 4,220,367 | 9/1980 | Gale et al. | 160/323 R X |
| 4,222,601 | 9/1980 | White et al. | 296/37.16 |
| 4,480,675 | 11/1984 | Berkemeier | 296/37.16 X |
| 4,502,674 | 3/1985 | White et al. | 160/23.1 X |
| 4,668,001 | 5/1987 | Okumura et al. | 296/37.16 |
| 4,671,557 | 6/1987 | Lemp | 296/37.16 |

*Primary Examiner*—Robert W. Gibson, Jr.
*Assistant Examiner*—David M. Purol
*Attorney, Agent, or Firm*—Fleit, Jacobson, Cohn & Price

[57] ABSTRACT

A winder for a baggage area cover sheet for an automobile automatically winds the cover sheet set in the baggage area by a winding drum which is energized by aid of rotation of a torsion coil spring. At the inner walls on both sides of the car, a securing device is fixed which includes, a pair of pressing members or a pair of pressing member and a latching member. The securing device maintains the winder in position by pressing it from both sides or one side.

1 Claim, 5 Drawing Sheets

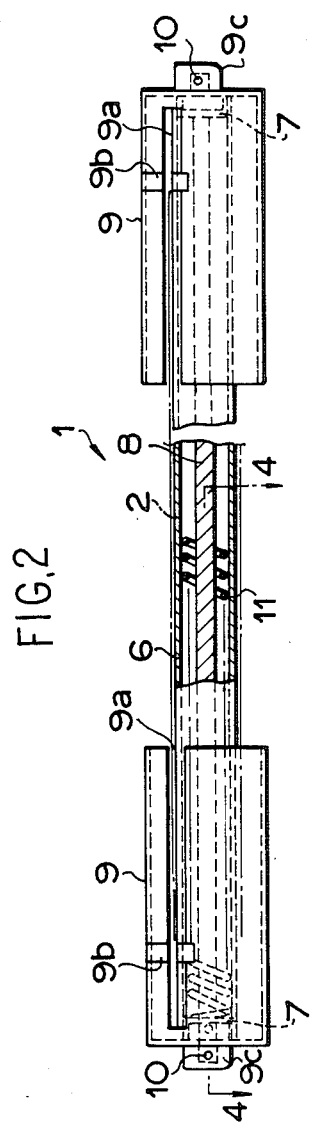
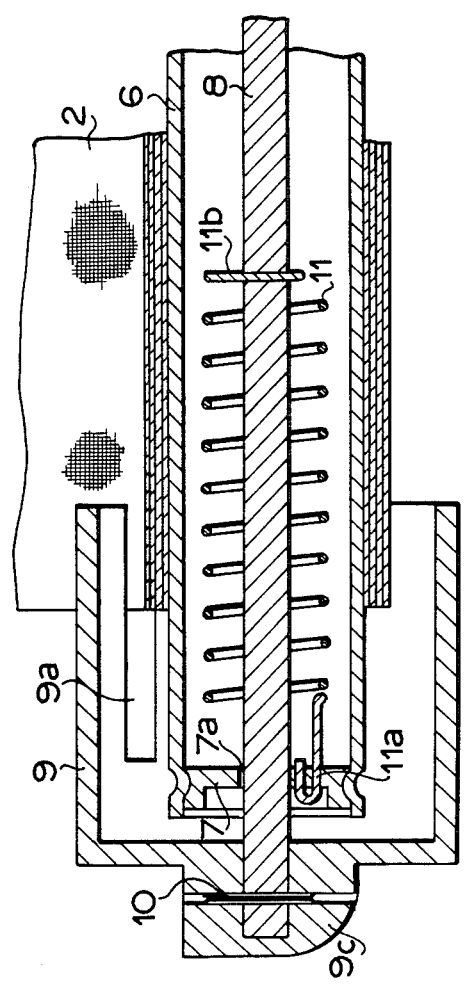

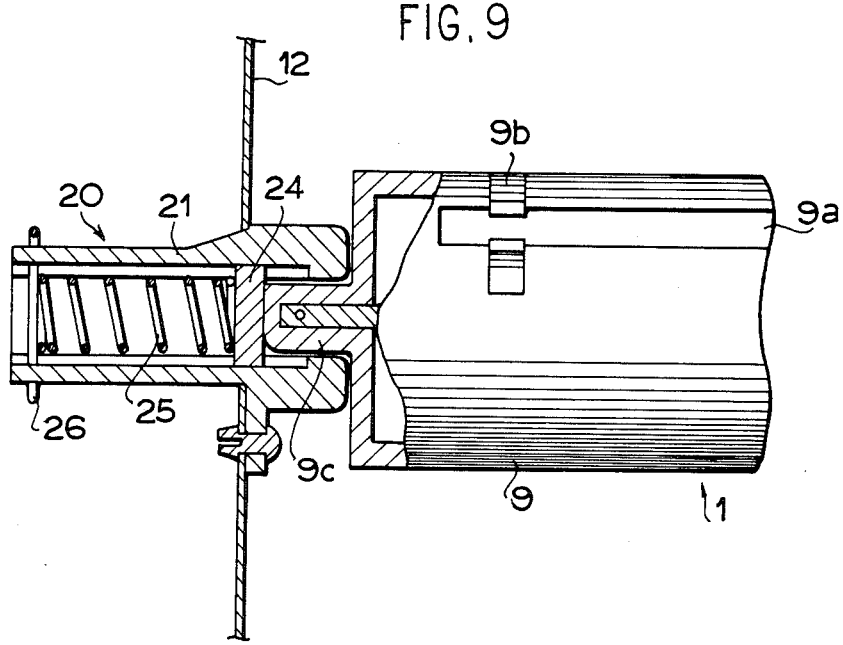
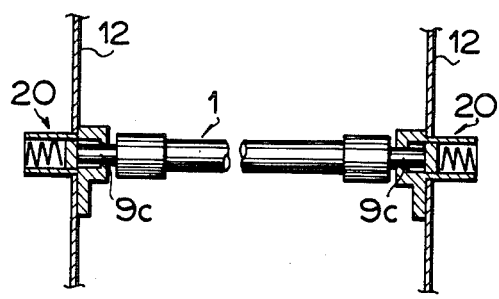
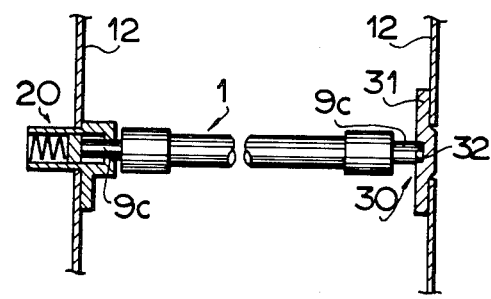

SECURING DEVICE FOR A BAGGAGE COVER SHEET WINDER

This is a divisional of application Ser. No. 551,608, filed Nov. 14, 1983, now U.S. Pat. No. 4,668,001.

BACKGROUND OF THE INVENTION

1. Field of the Invention

This invention relates to a winder for a baggage room cover sheet used in automobiles. The winder is constructed to wind a cover sheet, made of leather or the like. The cover sheet covers a baggage room and removably mounts a securing device transverse to the car body in automobiles of van or hatch back type.

2. Description of the Prior Art

Generally, when baggage is loaded in the baggage area of the automobile, it can be seen through a window of the car. The car is not only subject to damage or the influence of heat by direct sunshine, but also to damages from forcible entry into the car for purposes of robbery. A cover sheet which covers the baggage area is devised to overcome these problems.

Various kinds of such cover devices for the baggage area are known. However, in a conventional cover device, a winder of the cover sheet is fixed at a rear portion of a rear seat back so that the cover sheet may be fixed to a latching portion located at the rear of the car body after pulling out the cover sheet. When the rear seat is tilted towards the front seat to enlarge the baggage area or when the winder is removed from the car body for storage it is possible that the cover sheet will be pulled out of the winder and be twisted or rolled up in a bent condition.

Further, some conventional baggage cover device have an attaching mechanism at both ends of their main body.

Such kinds of references are illustrated in U.S. Pat. No. 4,139,231 and U.S. Pat. No. 4,168,094. In these references, however, when the winder is removed from the car body in a state such that the cover sheet is pulled out from the winder, the winder and the attached portion to the car body are constructed to connect with a case. The attached portion of the cover sheet is connected so that it does not lose its torsion force stored by a spring contained in the case. This is achieved by maintaining the torsion force of the spring in the portions which were attached to the car. By this, in the cited reference, the weight of the case is added to the winder device and the winder whole weight of the device is thereby increased. This affects the operation of attaching or removing of the winder device from the car.

Further, in U.S. Pat. No. 4,222,601 there is no such case as described above, but a device which locks the rotation of the attached portion of the cover sheet so that the attached portion of the cover sheet inside the winder does not lose the torsion force of a spring contained in the winder. However, this reference has other defects.

In other words, the reference has not only a complicated construction, but also is of a heavy weight and low reliability (accidents easily occurring). Further, since the locking device is contained in a small space, it is difficult to manufacture design. Therefore, the device is expensive to manufacture.

Now, another conventional winder will be described.

A conventional winder is secured to the car body by mounting a bracket or opening a hole in a car wall and inserting and securing a portion of the winder into the hole. A clearance is located between the car wall and the portion of the winder secured to car wall, which requires a special construction so that the appearance of the car is not spoiled or the winder is not able to move off from its bracket. As a result, the weight and the cost of the winder are increased. On the other hand, since the construction of an attached portion of the winder to the car necessitates extending or shortening the distance between the attached portions to secure the winder between the car walls, the weight of the winder is increased, whereby operation is not only disturbed, but also an increase of cost and a decrease of reliability result. Further, manufacture is difficult due to the small size of the winder.

SUMMARY OF THE INVENTION

The object of this invention is to provide a winder for a baggage area cover sheet for an automobile which is light in weight and avoids the rolling up of the cover sheet while in use, while when not in use there is no twisting of the cover sheet by the cover sheet being drawn out of the winder without of torsion force, even if the winder is removed from a car. Another object of this invention is to provide a securing device for a winder device which is easy to secure to the car body. The securing device is simple to use and accurate in positioning and attaching the winder device of the cover sheet of the baggage area for an automobile.

This invention has the following features for attaining the above purposes.

This invention includes a winder device for a baggage area cover sheet for an automobile and an attaching device constructed separately from the winder. The winder is provided with end caps consisting of an opening which guides both opposite side edges of said cover sheet as the cover sheet is pulled from the winder. A housing portion includes a locking pin removably inserted in the edge portion of a side of said cover sheet which has been drawn out from the winder device. A boss portion is attached at both ends of the winder. Further, an attaching device includes a pair of pressing members or a set including a pressing member and a latching member fixed to opposed walls of an automobile at right and left sides. The winder is adapted to press the boss portion for attaching the winder to the pressing and latching members from both sides or from only one side.

BRIEF DESCRIPTION OF THE DRAWINGS

FIG. 2 illustrates a winder for the baggage area cover sheet for an automobile, partially shown in a cross-sectional view according to this invention.

FIG. 4 is an enlarged cross-sectional view of FIG. 2 taken along line 4—4.

FIG. 9 is a fragmentary schematic view.

FIG. 10 and FIG. 11 are partial cross-sectional views which respectively represent the cover sheet winder install on the securing device.

DETAILED DESCRIPTION OF THE INVENTION

The invention will be described according to the embodiments illustrated as follows.

Figure 1:
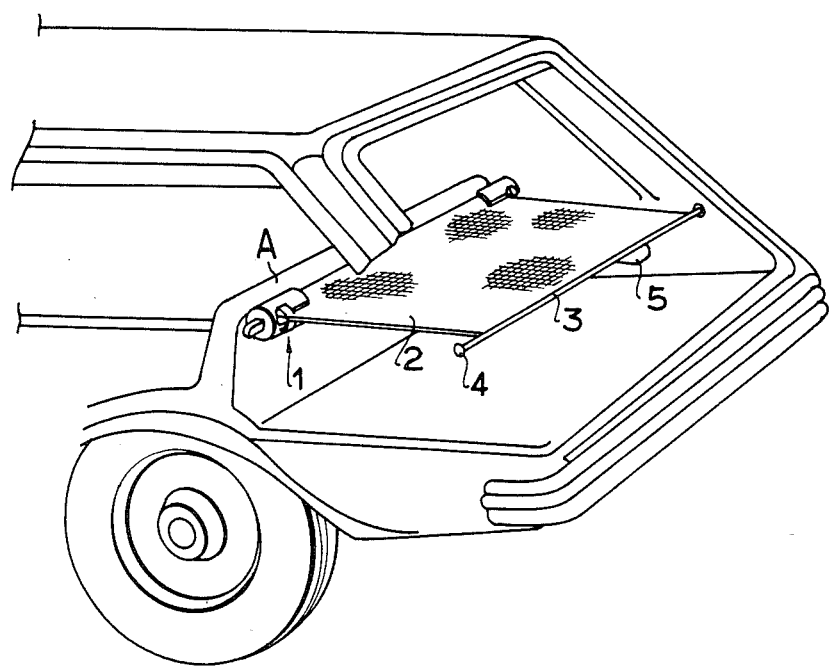
FIG. 1 is a perspective view which illustrates the securing of a winder of a baggage area cover sheet for an automobile according to this invention.

The winder of the baggage room cover sheet according to this invention is shown in FIG. 1.

Namely, the winder 1 of the baggage room cover sheet is removably mounted at the rear portion of a rear seat back A of the car, and the cover sheet 2 rolled in the winder 1 is pulled out to be latched to a latch portion at the rear of the car by the rear end thereof.

At the rear end portion of said cover sheet 2, a core member having the bar shape 3, which prevents the bend of the cover sheet 2, is fixed.

In FIG. 1, the numerals 4 and 5 are a locking pin and a handle portion for pulling out the cover sheet respectively.

Figure 3:
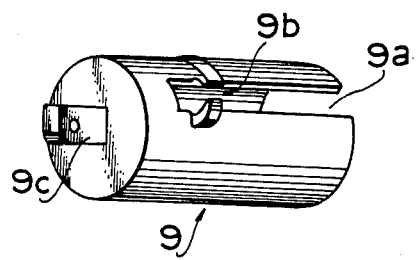
FIG. 3 is a perspective view of the end cap of the winder shown in FIG. 2.
Figure 5:
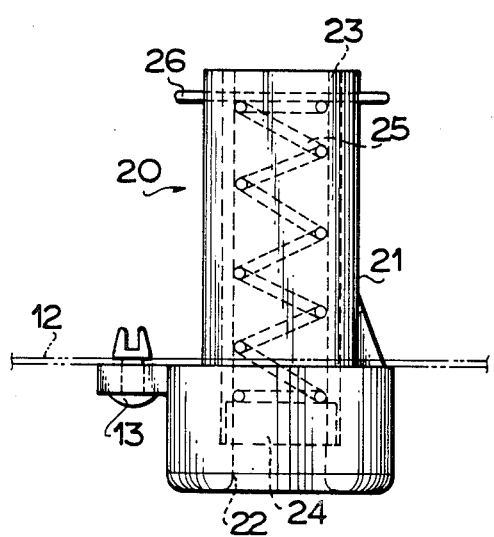
FIG. 5 is a front view which shows a pressing member mounted on the car body.
Figure 6:
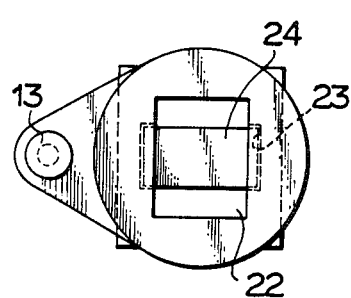
FIG. 6 and FIG. 7 are bottom and plan views of the pressing member of FIG. 5 respectively.

The winder 1 of the baggage room cover sheet is shown in FIG. 2 to FIG. 4.

The numeral 6 is a winding drum. The winding drum 6 is a cylindrical body having a length nearly equal to a width of the car body.

At both ends of the drum 6, a bearing portion 7 formed by a cylindrical body has a bottom surface provided with a hole 7a. The drum 6 is rotatably mounted with respect to a rod 8 inserted in the holes 7a.

The cover sheet 2 is wound on the winding drum 6 by a portion length of the cover sheet being fixed at one end to the drum.

The numeral 9 is an end cap which is formed of a cylindrical body made of plastic or the like and fixed to both ends of rod 8 by way of pin 10.

In end cap 9, pulling out opening 9a for the cover sheet 2 extends in an axial direction, as shown in FIG. 3. Formed at the side wall of the cylindrical body, and at both edge portions of the pulling out opening, a housing portion 9b protrudes having a pair of upper and lower detents. The housing portion 9b is engaged with locking pins 4 installed on the ends of the core member of the cover sheet 2, thereby completing the unwinding of the cover sheet 2 or locking the core member. Further, a boss portion 9c fixedly inserted into a securing device (described hereinafter) installed on the car body side is integrally formed at each end portion of the end cap 9.

The numeral 11 is a torsion coil spring inserted at its coil portion along the outside of rod 8, the torsion coil spring being hold inside the winding drum 6 by being latched at one end 11a to the bearing portion 7 and at another end to the rod 8 respectively. The torsion coil spring is provided with a fixed initial torsion.

The winder thus constructed acts as follows.

In the winder 1, the cover sheet 2 having a fixed length is wound and the locking pin 4 is fixedly inserted into the securing device (described hereinafter) which is installed on the car body by the boss portions 9c located on both sides of the winder so that said locking pin is engaged with the housing portion 9b of each end cap 9. The end caps 9 and the rod 8 are restrained against rotation due to the insertion of each boss portion 9c. On the other hand, the winding drum 6 rotates with respect to the rod 8 in this state. Thus, the winder 1 is attached to the car body, and when covering the baggage area, the locking pin 4 at the rear end of the cover sheet 2 is removed from the housing portion 9b and the cover sheet 2 is pulled out by a handle 5. The cover sheet pulled out is guided through the pulling out opening 9a of the end cap. By this operation, the winding drum 6 rotates, whereby the torsion coil spring is tightened.

By this, the winding drum 6 rotatively energizes the cover sheet 2 in the winding direction. However, the cover sheet is still pulled out opposing this energized force and latches the locking pins 4 installed at the rear end of said sheet to the latching portion at the rear of the car body, thereby covering the baggage area. In order to house the cover sheet in the winder 1, it is sufficient to release the latching state of the locking pins 4 at the rear of the car body. In other words, the cover sheet 2 released from the latching state is wound by the winding drum 6 which rotates by the aid of the energized force of the torsion coil spring being guided through the pulling out opening 9a of the end cap 9. At the completion of winding, the rewinding of the cover sheet 2 of the winder 1 is ended by engaging each locking pin 4 with the housing portion 9b of each end cap 9.

Now, the securing device of the winder 1 will be described.

The first securing device comprises a pair of pressing members. The pressing member 20 is shown in FIG. 5 to FIG. 8.

A cylindrical guide 21 is secured extending through the inner wall 12 of the baggage area of the car. The guide 21 is secured to the car body by traversely bridging the winder 1 across the baggage area cover sheet. For this purpose, the cylindrical guides 21 are installed opposite each other on the inner wall of the car.

An inserting hole 22 and a guide hole 23 are coaxially formed in the longitudinal direction of the cylindrical guide member 21, and an abut plate 24 and a coil spring 25 described hereinafter are inserted into the guide hole 23. The inserting hole 22 and guide hole 23 are formed square in the embodiments illustrated and the abut plate 24 which slides along the guide hole 23 is adapted to collide with a base end portion 22a of the inserting hole 22 to stop itself from continued movement.

Any shape of the inserting hole 22 is acceptable if only the inserted boss portion 9c has a shape which restrains its rotation in relation to the shape of boss portion 9c. For instance, the shape of inserting hole 22 may be a triangle or a hexagon without being restricted to square. Especially, the inserting hole 22 may be formed circular to form a key groove, thereby inserting the boss portion 9c of the winder member 1 therein so as not to rotate. The abut plates 24 are, in general, made of metal plate; and when the boss portions 9c of both end portions of the winder 1 of the cover sheet are respectively inserted in each inserting hole 22 of the cylindrical guide members 21 and 21 located opposite each other on the inner wall 12 of the car and the winder 1 is secured as shown in FIG. 9, the abut plates 24 abut to both edge surfaces of the boss portions 9c from the left side and the right side and act to press the boss portons 9c from both sides. For this purpose, a coil spring 25 is inserted into the guide hole 23 at the rear of the abut plate 24. A latching member 26 abuts another end portion of the coil spring 25 which is secured at the rear end side of the guide hole 23, and the latching member 26 abuts the end portion of the coil spring 25, whereby the abut plate 24 is pressingly energized toward the end surface of boss portion 9c of the winder 1.

Figure 7:
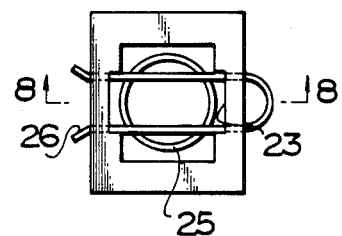
Figure 8:
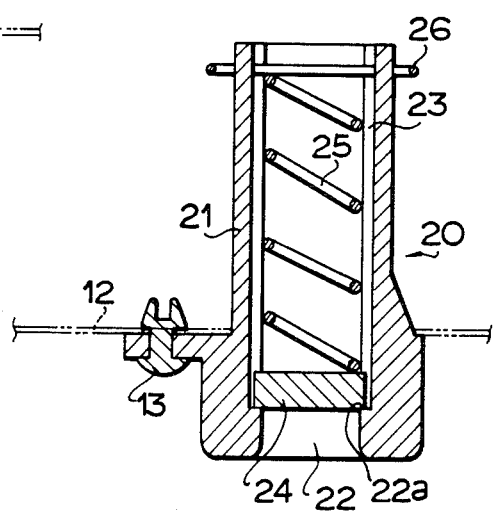
FIG. 8 is a sectional view taken along line 8—8 of FIG. 7.

The latching member 26 in the example is formed by a forked pin secured to the rear side of the inserting hole 22 as shown in FIG. 7.

In order to install pressing member 20 in the car, the abut plate 24 and the coil spring 25 are inserted, from the rear of the guide hole 23 of the cylindrical guide 21. Then, after inserting the cylindrical guide 21 into a hole formed at the inner wall 12 the pressing member 20 is clamped with screw 13.

In other words, the first securing device of this invention is, as shown in FIG. 10, constructed from a pair of pressing members 20 fixed to the inner walls of the car body, thereby pressingly energizing and maintaining the winder 1 of the baggage area cover sheet.

Further, the second securing device of this invention will be described as follows.

The second securing device consists of a pressing member 20 having an energizing function, and a latching member 30 having no energizing function which together form one pair as shown in FIG. 11. In FIG. 11, the numeral 12 is an inner wall of the car body.

Although, the ltching member 30 is operable with only a plate body 31 having an inserting hole 32 into which the boss portion 9c of winder 1 of the baggage room cover sheet is inserted, the following modified embodiment is considered. Further, the shape of the inserting hole 32 is formed to be a polyangular shape such as triangle or square by which the rotation of the inserted boss portion 9c is restrained.

Figure 13:
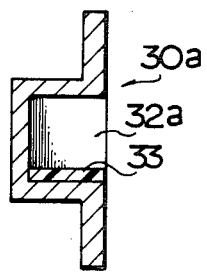
FIG. 13 is a sectional view of FIG. 12 taken along line 13—13.
Figure 12:
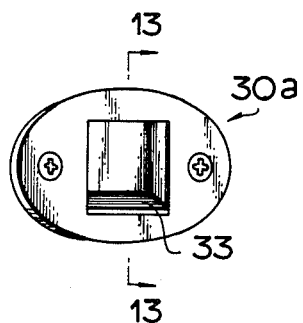
FIG. 12 is a perspective view of the latching member.
Figure 14:
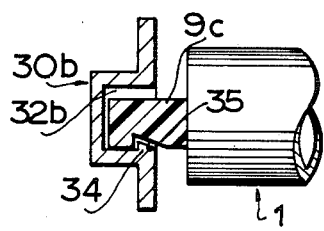
FIG. 14 to FIG. 16 are partial sectional views which represent other embodiments of the latching members.
Figure 16:
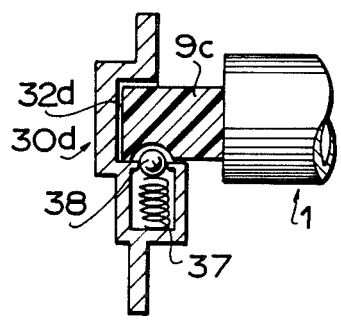
Figure 15:
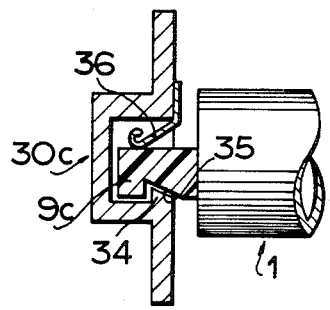

At the lower inside surface of an inserting hole 32, the rectangular shape of said latching member 30a shown in FIG. 12 and FIG. 13 engages, an antiskid member 33 made of rubber or the like which is stuck thereon. Further, at the lower inside surface of an inserting hole 32b of a latching member 30b shown in FIG. 14, a ratchet projection 34 is formed. On the other side, at the boss portion 9c of the winder 1 of the baggage room cover sheet, a detent portion 35 which engages with the ratchet projection 34 is formed. Furthermore, the latching member 30c shown in FIG. 15 includes a case wherein a plate spring presses the boss portion 9c downward abutting the upper surface of said boss portion 9c on the other side of the ratchet projection 34 of the latching member 30b and the detent portion 35 formed at boss portion 9c of the winder 1 in FIG. 14. At the latching member 30d shown in FIG. 16, a ball 38 is energized by being pushed up toward the lower portion of an inserting hole 32d with a spring 37, and the ball 38 is engaged into a detent 39 formed at the lower inside surface of boss portion 9c of the winder 1. Any of these modified embodiments are formed to prevent the falling-off of the boss portion 9c of the winder 1 of the cover sheet from the insertion hole of the latching member. Especially, FIG. 15 and FIG. 16 represent the intention to prevent play between the boss porton 9c of winder 1 and the latching member 30c or 30d and play between the boss portion 9c and the insertion hole 32c or 32d. It is effective when the spring constant of said latching member and said pressing member 20 which form a pair are comparatively weak, or the car runs on an uneven road.

Still further, in case of design of one side pressing member 20 which constitutes the second securing device, if the supporting force of the winder 1 is designed to be the same as the first securing device and also the same in deflection of the spring, the winder 1 is possibly supported by means of the coil spring 25 having half of the spring constant used for the first securing device compared with the case wherein the winder 1 is pressed by springs 25 from both ends of the winder 1 of the cover sheet as in the first securing device. Accordingly, the diameter of the coil spring 25 can be less than that of the first securing device.

Further, in the case of locating the first pressing member 20 on one side of the car and the end boss portion 9c of the winder 1 is inserted in said pressing member 20 which also constitutes the second securing device located on the other side of the car, the supporting force of the springs is designed so that the deflection of the coil spring 25 used for the members 20 is half of that required if only one pressing member were used. Therefore, it is possible to design the stroke length of the end boss portion 9c of winder 1 and the length of the insertion hole of pressing member 20 to be half of those in the first securing device respectively.

The winder of the baggage area cover sheet for automobile and its securing device of this invention constructed as described above, have the following features.

First, the winder of the baggage area cover sheet for automobile will be described.

According to the winder of this invention, when removing the winder from the car body or storage of the cover sheet, the winding and pulling out of the cover sheet can be locked by housing the locking pins mounted on the both end portions. Therefore, there is neither the loss of the torsion force stored in the coil spring nor a loose pulling out of the cover sheet.

Also, according to the winder of this invention, since the cover sheet is pulled out or wound off by guiding the edges of said cover sheet through a pulling out opening of the end caps, there is no need for a special guide member and the required parts are few. The winder is simple in construction, small in size and possible to be made of light weight and manufactured at low cost.

Now, the first and second securing devices of the winder for the baggage area cover sheet for an automobile of this invention will be described.

In the first and the second securing devices, the abut plates are provided so that either a pair of pressing members or one of two pressing members may slide into the guide holes of the cylindrical guide respectively. Since the abut plate is energized by a coil spring, the winder of the cover sheet can be removably installed in the car. By installing it, the winder can be maintained stably and securely. Further, even when a variation occurs between the winder and the car wall to which the winder is secured due to the variation of precise dimensions of the car, a good securing state can be maintained. Furthermore, since both first and second securing devices are respectively secured to the inner wall of the car, there is no need of providing a special securing mechanism for the winder of the cover sheet, whereby the winder itself can be miniaturized, intending to decrease its weight and ease of removability.

The second securing device consists of the pressing member having a pressingly energizing function and the latching member having no pressingly energizing function. Accordingly, in case of securing the winder of the cover sheet, since the securing device is pressed only from one side and not pressed from another side, the vibration of the spring having a pressingly energizing function is absorbed by the latching member on the opposite side, whereby there is no occurrence of vibration, and play of the secured winder is reduced and a more stable support than that of the first securing device can be obtained.

Still further, since the second securing device has no interference from a pressing force between the mutual springs as in the first securing device, the positioning of the winder can be performed with ease and a spring having a smaller spring constant than that of the first securing device can be used, thereby being able to miniaturize and decrease the weight from the first securing device.

What we claim is:

1. A baggage area cover sheet winder comprising:
   a winding drum,
   a rod disposed longitudinally within said winding drum,
   a cover sheet fixed at one end to said winding drum,
   a rigid core member fixed at an opposite end of said cover sheet from said one end, said rigid core member terminating with a locking pin at each of its ends,
   a spring located between said winding drum and said rod, and
   an end cap fixed at each end of said rod, each said end cap including (a) a pulling out opening for guiding passage of said cover sheet into and out of said end cap, (b) a boss portion projecting outwardly from said end cap for engagement with a device to secure the winder to the sides of an automobile, and (c) a housing portion having an upper detent and a lower detent for removably locking said locking pins therebetween to prevent pulling out of said cover sheet except by exertion of a predetermined amount of fore and to prevent loss of torsion in said spring due to free rolling of said winding drum.

* * * * *